(12) United States Patent
Lin et al.

(10) Patent No.: US 6,720,373 B2
(45) Date of Patent: *Apr. 13, 2004

(54) HIGH SOLIDS EMULSIONS OF CURABLE ELASTOMERIC POLYMERS

(75) Inventors: Shaow Burn Lin, Midland, MI (US); Todd Matthew Starke, Bay City, MI (US)

(73) Assignee: Dow Corning Corporation, Midland, MI (US)

( * ) Notice: Subject to any disclaimer, the term of this patent is extended or adjusted under 35 U.S.C. 154(b) by 278 days.

This patent is subject to a terminal disclaimer.

(21) Appl. No.: 09/905,660

(22) Filed: Jul. 13, 2001

(65) Prior Publication Data

US 2003/0088005 A1 May 8, 2003

(51) Int. Cl.$^7$ .................................. C08K 5/09
(52) U.S. Cl. ..................... 524/284; 524/588; 524/801; 524/806; 524/837
(58) Field of Search ................. 524/806, 801, 524/837, 588, 284

(56) References Cited

U.S. PATENT DOCUMENTS

| | | | |
|---|---|---|---|
| 3,360,599 A | 12/1967 | Nyberg et al. | 264/216 |
| 3,503,917 A | 3/1970 | Burke Jr. | 260/29.6 |
| 4,070,325 A | 1/1978 | Burke, Jr. | 260/29.7 |
| 4,123,403 A | 10/1978 | Warner et al. | 260/29.2 |
| 4,177,177 A | 12/1979 | Vanderhoff et al. | 260/29.2 |
| 4,243,566 A | 1/1981 | Burke, Jr. | 260/29.6 |
| 4,444,803 A * | 4/1984 | Winters et al. | 427/485 |
| 4,814,376 A | 3/1989 | Tanaka et al. | 524/588 |
| 4,904,732 A | 2/1990 | Iwahara et al. | 525/100 |
| 5,162,445 A | 11/1992 | Powers et al. | 525/333.4 |
| 5,421,866 A * | 6/1995 | Stark-Kasley et al. | 106/2 |
| 5,426,167 A | 6/1995 | Powers et al. | 526/347 |
| 5,539,021 A | 7/1996 | Pate et al. | 523/335 |
| 5,543,484 A * | 8/1996 | Chung et al. | 526/347.1 |
| 5,554,726 A | 9/1996 | Araki et al. | 528/495 |
| 5,574,091 A | 11/1996 | Walther et al. | 524/570 |
| 5,641,433 A | 6/1997 | Chirinos et al. | 252/312 |
| 5,656,694 A * | 8/1997 | Frechet et al. | 525/195 |
| 5,688,842 A | 11/1997 | Pate, III et al. | 523/335 |
| 5,744,544 A * | 4/1998 | Dunaway et al. | 524/832 |
| 5,763,505 A * | 6/1998 | Derian et al. | 523/322 |
| 5,798,410 A | 8/1998 | Walther et al. | 524/570 |
| 5,806,975 A | 9/1998 | Hosokawa et al. | 366/301 |
| 5,840,800 A * | 11/1998 | Joffre et al. | 524/806 |
| 5,851,594 A | 12/1998 | Feder et al. | 427/387 |
| 5,942,574 A | 8/1999 | Hosokawa et al. | 524/837 |
| 6,103,786 A | 8/2000 | Hoch et al. | 523/336 |
| 6,156,806 A | 12/2000 | Piechocki et al. | 516/64 |
| 6,177,519 B1 | 1/2001 | Chung et al. | 525/263 |
| 6,590,026 B1 * | 7/2003 | Dorget et al. | 524/588 |

FOREIGN PATENT DOCUMENTS

| | | | |
|---|---|---|---|
| EP | 0463431 A2 | 2/1992 | C08J/3/03 |
| EP | 0640670 A2 | 8/1994 | C09D/183/04 |
| EP | 0739928 A2 | 10/1996 | C08J/3/03 |
| EP | 0818496 A2 | 1/1998 | C08J/3/25 |
| EP | 0818497 A2 | 1/1998 | C08J/3/26 |
| JP | 58208341 | 12/1983 | A61L/15/00 |
| JP | 59122534 | 7/1984 | A61L/15/00 |
| JP | 7173346 | 7/1995 | A61K/7/00 |
| JP | 10204235 | 8/1998 | A61K/7/02 |
| JP | 10204243 | 8/1998 | A61K/7/02 |
| JP | 10036575 A | 10/1998 | C09L/21/02 |

* cited by examiner

Primary Examiner—David W. Wu
Assistant Examiner—Henry S. Hu
(74) Attorney, Agent, or Firm—Alan Zombeck

(57) ABSTRACT

Water-continuous emulsion of curable elastomeric polymers are disclosed having a solids content of greater than 75%, an average particle size less than 5 μm, and having sufficient stability to produce a stable lower solids emulsion upon dilution with water comprising; a curable elastomeric polymer, surfactant, internal cure additive, water, optional plasticizer, and optional low molecular weight acid. The water-continuous emulsions of curable elastomeric polymers can be prepared by; (I) forming a premix comprising an elastomeric polymer, surfactant, internal cure additive, and optionally a plasticizer and low molecular weight acid, and (II) adding water to the premix with mixing to form a water continuous emulsion of the curable elastomeric polymer having a solids content of greater than 75%, an average particle size less than 5 μm, and having sufficient stability to produce a stable lower solids emulsion upon dilution with water.

23 Claims, No Drawings

HIGH SOLIDS EMULSIONS OF CURABLE ELASTOMERIC POLYMERS

FIELD OF THE INVENTION

This invention relates to water-continuous emulsions of curable elastomeric polymers and processes for preparing such emulsions. In particular, this invention relates to high solids water-continuous emulsions of curable elastomeric polymers having a solids content greater than 75%, an average particle size less than 5 μm.

BACKGROUND OF THE INVENTION

Emulsions of high molecular weight polymers are commonly prepared using emulsion polymerization or suspension polymerization techniques. These techniques involve first preparing emulsions or suspensions of the monomer starting materials, and subsequently polymerizing the monomers in-situ to create the high molecular weight polymers. Such techniques avoid the handling and processing problems associated with high molecular weight polymers. However, the type of high molecular weight polymers that can be prepared by such techniques are often limited, and furthermore, the resulting physical properties of the emulsions can often limit their use in many applications.

Alternatively, emulsions of high molecular weight polymers have been prepared by first dispersing the preformed high molecular weight polymer in a solvent. Some representative examples of this art are shown and others further discussed in U.S. Pat. Nos. 4,177,177 and 6,103,786. Also representative of this art are techniques known to create latex emulsions, illustrative examples of this art are taught in U.S. Pat. Nos. 3,360,599, 3,503,917, 4,070,325, 4,243,566, 5,554,726, 5,574,091 and 5,798,410, where the high molecular weight polymer is dispersed in a solvent and is subsequently emulsified.

High internal phase emulsions of high molecular weight polymers are described in U.S. Pat. Nos. 5,539,021, 5,688,842, and 6,156,806. However, these examples also require the use of organic solvents to dissolve the high molecular polymers.

The presence of solvent in emulsions can be hazardous in certain applications or limit usage in other instances because of environmental concerns. For example, many of the commercially important volatile organic solvents are also hazardous to health and environment such as ozone depletion, air pollution, and water contamination. The presence of such volatile solvents in emulsions are highly undesirable to both the producers and the users of emulsions as special handling precautions and equipments are required to minimize the workers' exposure and release to environment.

Alternative techniques have thus been sought to prepare emulsions of preformed high molecular weight polymers that avoid the shortcomings mentioned above. For example, U.S. Pat. No. 4,123,403 provides a continuous process for preparing aqueous polymer microsuspensions. Aqueous microsuspensions of solid polymers are prepared by a continuous process comprising the steps of; (a) forming a heterogeneous composition having a discontinuous aqueous phase and a continuous polymer phase at temperatures above the polymer melting point (e.g. melting above 20° C.), and (b) converting the resulting polymer continuous heterogeneous composition to a water-continuous heterogeneous composition. The '403 patent describes its process as useful for solid polymers, and for thermoplastic solids whose degradation point is somewhat higher than its melting point, and is particularly useful for polymers having a melt flow rate of less than about 40, and temperature sensitive polymers.

Emulsions of high molecular weight polyisobutylene have been reported in Japanese Patent Application Publications 58208341, 59122534, 7173346, 10204234, and 10204235. The publications describe polyisobutylene emulsions having a 1–75% solid content which are prepared with specific types of surfactants, for example a combination of polyoxyethylene-oxypropylene block polymer with polyoxyethylene alkyl ether sulfate ester are described in JP 10204234.

Emulsions of preformed high molecular weight silicones have been reported. For example, U.S. Pat. Nos. 5,806,975 and 5,942,574 describe a method for continuous emulsification of organopolysiloxane gums involving a compounding extruder of a specific design, which requires a minimum shear rate of 10 sec$^{-1}$. While the '975 and '574 patents describe its apparatus and method as capable of emulsifying organopolysiloxane gums having a viscosity in excess of 500,000 centipoise, examples were limited to a trimethylsiloxy-endblocked dimethylpolysiloxane gum with a viscosity of 10 million centipoises (10 KPa-s).

U.S. Pat. No. 5,840,800 describes crosslinked emulsions of pre-formed silicon modified organic polymers having a viscosity of 5–500 Pa-s and a glass transition temperature of less than 20° C. The '800 process describes the formation of a crosslinked emulsion by a) forming an emulsion of silicon modified organic polymers having a viscosity of 5–500 Pa-s (or 0.005–0.5 KPa-s) and b) allowing crosslinking to occur within the emulsion resulting in emulsions of crosslinked polymers.

Processes are needed for the preparation of high solids emulsions of preformed high viscosity elastomeric polymers and elastomeric polymers with curable functionalities. Furthermore, high solids emulsions of elastomeric polymers that are stable with time, and can be further diluted to produce stable emulsions are sought in many industrial processes such as coating applications. A high solids emulsions (e.g. 75% by weight) of such elastomeric polymers will allow development of higher solids, water-based coatings, adhesives, and sealants formulations. The preparation of a high solids emulsion of high viscosity elastomeric polymers with curable functionalities will allow development of curable or crosslinkable coatings, adhesives, and sealants formulations with improved properties, performance and stability over their non-curable or pre-crosslinked elastomeric polymer analogues.

Heretofore a method has not been disclosed for the preparation of stable water-continuous emulsions of high viscosity curable elastomeric polymers having a high solids content, which also yields stable lower solids emulsions upon dilution.

An object of this invention is to provide a process for preparing water continuous emulsions of curable elastomeric polymers.

It is a further object of this invention to provide water continuous emulsions of curable elastomeric polymers with a solids content greater than 75% by weight having a particle size of less than 5 μm that are stable with time.

It is yet a further object of this invention to provide stable emulsions of curable elastomeric polymers prepared by the dilution of the high solids emulsions of the curable elastomeric polymer.

SUMMARY OF THE INVENTION

This invention relates to a water-continuous emulsion of curable elastomeric polymers having a solids content of greater than 75%, an average particle size less than 5 μm, and having sufficient stability to produce a stable lower solids emulsion upon dilution with water comprising; a curable elastomeric polymer, surfactant, an internal cure additive, water, an optional plasticizer, an optional low molecular weight acid.

This invention also relates to processes for preparing water-continuous emulsions of curable elastomeric polymers by; (I) forming a premix comprising a curable elastomeric polymer, surfactant, an internal cure additive, and optionally a plasticizer and a low molecular weight acid, and (II) adding water to the premix with mixing to form a water continuous emulsion of the curable elastomeric polymer having a solids content of greater than 75%, an average particle size less than 5 μm, and having sufficient stability to produce a stable lower solids emulsion upon dilution with water. In a preferred embodiment, the water continuous emulsions of curable elastomeric polymers can be prepared by adding the water to a premix of curable elastomeric polymer, surfactant, internal cure additive, optional plasticizer, and optional low molecular weight acid in incremental portions, whereby each incremental portion comprises less than 8 weight % of the premix and each incremental portion of water is added successively to the previous after the dispersion of the previous incremental portion of water, wherein sufficient incremental portions of water are added to form the water-continuous emulsion of the curable elastomeric polymer. The present inventors have unexpectedly found this stepwise addition of water in small incremental portions allows for the formation of the emulsion and enhances the emulsion stability at relatively high solids contents.

DETAILED DESCRIPTION OF THE INVENTION

This invention relates to a water-continuous emulsion composition comprising;
(A) 100 parts of a curable elastomeric polymer having a viscosity of 0.5–1,000,000 KPa-s and a glass transition temperature up to 50° C.,
(B) 3 to 30 parts surfactant
(C) 0.5 to 50 parts of an internal cure additive
(D) 5 to 45 parts water
wherein the water-continuous emulsion has a solids content of greater than 75%, an average particle size less than 5 μm and having sufficient stability to produce a stable lower solids emulsion upon dilution with water.

As used herein, "water-continuous emulsion" refers to an emulsion having water as the continuous phase of the emulsion. Water-continuous emulsions are characterized by their miscibility with water and/or their ability to be diluted by the further addition of water.

The elastomeric polymers that can be used as starting materials to prepare the curable elastomeric polymers of the present invention are any polymers having a viscosity of 0.5–1,000,000 KPa-s and a glass transition temperature up to 50° C. One skilled in the art recognizes the term elastomeric to describe materials as having rubber-like properties or rubbery characteristics, that is, materials which can be extended to twice its own length at room temperature or having an elongation of 100% or higher at room temperature. When the term "polymer" is used herein, it should be understood to describe polymers that may be homopolymers, copolymers, terpolymers, and mixtures thereof.

For the purpose of this invention, the viscosity of the curable elastomeric polymer is defined as "zero-shear" viscosity at ambient temperature. This is commonly defined as the viscosity of a polymer when approaching zero-shear rate conditions and is regarded as a constant value for a given polymer. The "zero-shear" viscosity is an approximated constant viscosity value derived empirically or from experimentally measured viscosity values.

The curable elastomeric polymers that can be emulsified by the process of the present invention can have a viscosity of 0.5 to 1,000,000 KPa-s, preferably the viscosity is 0.5 to 500,000 KPa-s, and most preferable is when the curable elastomeric polymer has a viscosity of 1.0 to 100,000 KPa-s. While the correlation of viscosity and molecular weight will vary depending on the specific type of polymer, generally the number average molecular weights (Mn) of the curable elastomeric polymers that can be typically used in the present invention range from 5,000 to 300,000 g/mole, preferably 5,000 to 200,000 g/mole, and most preferably range from 5,000 to 100,000 g/mole.

For purposes of this invention, the term "glass transition temperature" is the accepted meaning in the art, that is, the temperature at which a polymer changes from a brittle vitreous state to a plastic state. The glass transition temperature can be determined by conventional methods such as dynamic mechanical analyzer (DMA) and differential scanning calorimetry (DSC). The curable elastomeric polymers of the present invention should have a glass transition temperature of less than 50° C. Preferably, the curable elastomeric polymers of the present invention should have a glass transition temperature of less than 30° C., and more preferably, the curable elastomeric polymers should have a glass transition temperature of less than 0° C.

As used herein, "curable elastomeric polymer" refers to any elastomeric polymer that has been modified to have at least one curable functional group attached to the polymer. Generally, curable elastomeric polymers are polymers having reactive groups contained therein that are able to crosslink during the curing process to yield an elastomeric polymer. The curable elastomeric polymers can be characterized as elastomeric polymers to which at least one reactive group or functional group is attached such as an alkenyl, vinyl, allyl, hydroxyl, carboxyl, epoxy, vinyl ether, alkoxy, silane, organosilane, or organosilyl group. The reactive-group or functional group may be attached at a terminal and/or pendant position on the polymer chain. The curable elastomeric polymer should maintain structural integrity during the emulsification process and subsequently in the emulsion state. Upon water-removal, for example as in a coating application, the reactive-group or functional group cures to form a cured elastomeric polymer or coating of the elastomeric polymer. The curing may take place by merely drying off the water, or assisted by an external catalyst, heat, radiation, moisture, or in conjunction with an external curative.

The elastomeric polymers that can be used as starting materials to prepare the curable elastomeric polymers which can be emulsified by the process of the present invention include, but are not limited to, the elastomeric polymers typically associated with the following general classes of elastomeric materials such as; natural rubber, styrene-butadiene, butadiene, ethylene-propylene-diene polymers (EPDM), butyl rubber, nitrile rubber, chloroprene rubber, fluorocarbon elastomers, polysulfide rubbers, silicones, and polyurethane.

Illustrative examples of conventional elastomeric polymers which can be curable and then subsequently emulsified according to the present invention include, but are not limited to: poly(olefins) and poly(olefins-dienes)

copolymers, and their derivatives, that is, polymers and copolymers derived from olefinic monomers $C_2$ to $C_{12}$, dienes $C_4$ to $C_{12}$ such as, polyethylene, polypropylene, poly(butene-1), poly(propylethylene), poly(decylethylene), poly(dodecylethylene), poly(butylethylene), poly (ethylethylene), poly(ethyl-2-propylene), poly (isopropylethylene), poly(isobutylethylene), poly (isopentylethylene), poly(heptylethylene), poly(tert-butylethylene), poly(ethyele-co-propylene), poly(ethylene-propylene-diene) terpolymers (EPDM); polymers and copolymers of monoolefin, isomonoolefin and vinyl aromatic monomers, such as $C_2$ to $C_{12}$ monoolefins, $C_4$ to $C_{12}$ isomonoolefins, vinyl aromatic monomers including styrene, para-alkylstyrene, para-methylstyrene, (methods of preparing such polymers can be found in U.S. Pat. No. 5,162,445, and U.S. Pat. No. 5,543,484); poly(dienes) and derivatives; such as, polybutadiene, polyisoprene, poly (alkyl-butenylene) where alkyl can be a hydrocarbon group containing 1 to 12 carbon atoms, poly(phenyl-butenylene), polypentenylene, natural rubber (a form of polyisoprene), butyl rubber (copolymer of isobutylene and isoprene), illustrative commercial examples of polyisobutylenes suitable in the present invention are Oppanol B products from BASF (BASF, Ludwigshafen, Germany), Vistanex™ products from Exxon (Houston, Tex.), and Epion A products from Kaneka (Kanegafuchi Chemical Industry Co. Ltd. Tokyo, Japan and Kaneka America Corp, New York, N.Y.); halogenated olefin polymers; such as from the bromination of copolymers of isomonoolefin with paramethylstyrene to introduce benzylic halogen (as described in U.S. Pat. No. 5,162,445), halogenated polybutadienes, halogenated polyisobutylene such as Exxpro™ products from Exxon-Mobil (Houston, Tex.), poly(2-chloro-1,3-butadiene), polychloroprene (85% trans), poly(1-chloro-1-butenylene) (Neoprene™), chlorosulfonated polyethylene; polyurethanes and polyureas; such as elastomeric polyurethanes and polyureas prepared from a wide variety of monomeric diisocyanates (aliphatic diisocyanates such as hexamethylene diisocyanate, cyclohexyldiisocyanate; aromatic diisocyanates such as toluene diisocyanate (TDI), bis(methylene-p-phenyl) diisocyanate (MDI), isophorone diisocyanate (IPDI)), chain-extending diols, diamines, and oligomeric diols selected from polyether, polyester, polycarbonate, and polycaprolactam; poly(alkyl acrylates), and poly (alkyl methacryaltes), that is polymers and copolymers derived from alkyl acrylates and alkyl methacrylates such as poly (methyl acrylate), poly(ethyl acrylate), poly(butyl acrylate), poly(isobutyl acrylate), poly(2-ethylbutyl acrylate), poly(2-ethylhexyl acrylate), poly(n-octyl methacrylate), poly (dodecyl acrylate); copolymers and terpolymers of dienes, alkenes, styrenes, acrylonitriles, such as poly(butadiene-co-styrene), poly(butadiene-co-acrylonitrile), poly(butadiene-co-methyl metharyalte); poly(fluoroalkyl acrylates) that is polymers and copolymers derived from fluoro-containing acrylates and methacrylates such as polymer(fluoromethyl acrylate), poly(2,2,2-trifluoroethyl acryalte), poly(1H,1H-pentfluoropropyl acryate), poly(1H,1H,5H-octafluoropentyl acrylate); poly(vinyl ethers) and poly(vinyl thioethers) such as those polymers derived from butoxyethylene, sec-butoxyethylene, tert-butoxyethylene, alkyl vinyl ether, propoxyethylene, vinyl methyl ether (methoxyethylene), hexyloxyethylene, 2-ethylhexyloxy ethylene, butylthioethylene; poly(oxyalkylenes) such as poly(oxyethylene), poly (oxypropylene), poly(oxythylene-co-propylene); plasticizer compounded thermoplastics, that is thermoplastics having elastomeric behavior because of the addition of a plasticizers or other compatible additives, such as poly(vinyl chloride) compounded with dioctyl phthalate, tricresyl phophate, dibutyl sebacate, or poly(propylene adipate); fluoro elastomers and chloro-containing polymers derived from poly (alkylenes), poly(dienes) such as, poly(dichloroethyelene), poly(chlorofluoroethylene).

Thus, the curable elastomeric polymers can be an alkenyl-functional elastomeric polymer where the alkenyl group is selected from a hydrocarbon group containing 2 to 12 carbons such as vinyl, allyl, propenyl, butenyl, hexenyl, etc. The elastomeric polymers bearing such alkenyl functional groups may be derived from most of the elastomeric polymers, as described above, including poly(olefins) and poly(olefins-dienes) copolymers, and their derivatives: polymers and copolymers derived from olefinic monomers $C_2$ to $C_{12}$, dienes $C_4$ to $C_{12}$; polymers and copolymers of monoolefin, isomonoolefin and vinyl aromatic monomers: monoolefin $C_2$ to $C_{12}$, isomonoolefin $C_4$ to $C_{12}$, vinyl aromatic monomers including styrene, para-alkylstyrene, para-methylstyrene; examples include polymers derived from ethylene, propylene, isobutylene, isoprene, para-methylstyrene.

The curable elastomeric polymers can also be poly (dienes) and derivatives. Most of polymers, copolymers derived from dienes usually contain unsaturated ethylenic units on backbone or side-chains that are curable. Representative examples include polybutadiene, polyisoprene, polybutenylene, poly(alkyl-butenylene) where alkyl being $C_1$ to $C_{12}$, poly(phenyl-butenylene), polypentenylene, natural rubber (a form of polyisoprene); butyl rubber (copolymer of isobutylene and isoprene).

The curable elastomeric polymers can also be a halogenated olefin polymer. Representative examples of a halogenated olefin polymer include those polymers resulting from the bromination of a copolymer of isomonoolefin with para-methylstyrene to introduce benzylic halogen (as described in U.S. Pat. No. 5,162,445), halogenated polybutadienes, halogenated polyisobutylene, poly(2-chloro-1,3-butadiene), polychloroprene (85% trans), poly(1-chloro-1-butenylene) (Neoprene™), chlorosulfonated polyethylene. The brominated poly(isobutylene-co-para-methylstyrene) can be further cured via zinc oxide upon influence of heat.

The curable elastomeric polymers which can be silylated and then subsequently emulsified according to the present invention can also be polymers containing vinyl ether-, acrylate-, methyacrylate-, and epoxy-functional groups. Also, the elastomeric polymers can be hydroxyl terminal or hydroxy containing poly(oxyalkylenes) polymers, such as poly(oxyethylene), poly(oxypropylene), or poly (oxyethylene-co-oxypropylene) polymers.

The curable elastomeric polymer can be selected from reactive silane group-containing elastomeric polymers, mixtures of reactive silane group-containing elastomeric polymers, blends of reactive silane group-containing elastomeric polymers with conventional elastomeric polymers, mixtures or blends of conventional elastomeric polymers with reactive silane group containing silicone polymers. The reactive silane groups may be attached at the terminal and/or pendant positions on the polymer chain and the total number of these reactive silicone groups may be varied to provide a cured elastomeric structure with desirable properties. Representative silane-modified elastomeric polymers are silyated polymers and copolymers derived from olefins, such as the isobutylene polymers disclosed in U.S. Pat. No. 4,904,732, which is hereby incorporated by reference, isomonoolefin, dienes, ethylene or propylene oxides, vinyl aromatic monomers from $C_2$ to $C_{12}$ such as the silane-grafted copolymers of isomonoolefin and vinyl aromatic monomer as discussed in U.S. Pat. Nos. 6,177,519 B1 and 5,426,167. Commerical products illustrative of silylated propylene oxide polymers are the MS Polymers from Kaneka (Kanegafuchi Chemical Industry Co. Ltd. Tokyo, Japan and Kaneka America Corp, New York, N.Y.). Other representative silicon-modified elastomeric polymers are illustrated by, but not limited to; alkenylsilyl-functional elastomeric polymers such as vinylsilyl-, allylsilyl-, hexenylsilyl-containing elastomeric polymers that are curable to form and further the elastomeric polymer structure; and alkoxysilyl-functional elastomeric polymers such as polymers containing at least one alkoxylsilyl groups and/or their hydrolysates selected from methoxysilyl, dimethoxysilyl, trimethoxysilyl, ethoxysilyl, diethoxysilyl, triethoxysilyl, and methoxyethoxylsilyl.

In a preferred embodiment of the present invention, the curable elastomeric polymer is selected from the silylated copolymers of an isomonoolefin and a vinyl aromatic monomer as described in U.S. Pat. No. 6,177,519 B1, which is hereby incorporated by reference. The silylated copolymers may be characterized as the addition product of an olefin copolymer radical created by contact of the copolymer with a free radical generating agent and an olefinically unsaturated, hydrolyzable silane wherein the silane adds to the polymer backbone to produce a silane grafted or silane modified copolymer product.

Illustrative examples of olefin copolymers suitable for modification with silanes to produce the preferred silylated copolymers of the present invention comprise copolymers containing at least 50 mole % of at least one $C_4$ to $C_7$ isomonoolefin and from 0.1 up to 50 mole % of at least one vinyl aromatic monomer. Preferred vinyl aromatic monomers are mono-vinyl aromatics such as styrene, alpha-methylstyrene, alkyl-substituted styrenes such as t-butylstyrene and para-alkyl substituted styrenes wherein the alkyl group contains from 1 to 4 carbon atoms, more preferably para-methylstyrene. Suitable isomonoolefin monomers include isobutylene and the like. Preferably, 100% of the isomonoolefinic content of the copolymer comprises isobutylene. Preferred olefin copolymers include elastomeric copolymers comprising isobutylene and para-methylstyrene and containing from about 0.1 to 20 mole % of para-methylstyrene. These copolymers have a substantially homogeneous compositional distribution such that at least 95% by weight of the polymer has a para-methylstyrene content within 10% of the average para-methylstyrene content of the polymer. They are also characterized by a narrow molecular weight distribution (Mw/Mn) of less than about 5, more preferably less than about 3.5, a glass transition temperature ($T_g$) of below about $-50°$ C. and a number average molecular weight (Mn) in the range of about 2,000 to 1,000,000, and even more preferably from 10,000 to 50,000.

Suitable unsaturated organic silanes which can be reacted with the olefin copolymer backbone to produce the preferred silylated copolymers of the present invention are of the general formula $RR'SiY_2$ wherein R represents a monovalent olefinically unsaturated hydrocarbon or hydrocarbonoxy radical reactive with the free radical sites produced on the backbone polymer, Y represents a hydrolyzable organic radical and R' represents an alkyl or aryl radical or a Y radical. Where R is a hydrocarbonoxy radical, it should be non-hydrolyzable. In the preferred embodiment R may be a vinyl, allyl, butenyl, 4-pentenyl, 5-hexenyl, cyclohexenyl or cyclopentadienyl radical, with vinyl being the most preferred radical. The group Y may be one or a mixture of $C_1$ to $C_4$ alkoxy radical such as methoxy, ethoxy or butoxy; Y may also be selected from acyloxy radicals such as formyloxy, acetoxy or propionoxy; oximo radicals such as $—ON=C(CH_3)_2$, $—ON=C(CH_3)(C_2H_5)$ and $—ON=C(C_6H_5)_2$; or substituted amino radicals such as alkylamino or arylamino radicals, including $—NHCH_3$, $—NHC_2H_5$ and $—NHC_6H_5$ radicals. The group R' represents either an alkyl group, an aryl group or a Y group. The group R' can be exemplified by a methyl, ethyl, propyl, butyl, phenyl, alkylphenyl group or a Y group. Preferably, R' is a methyl or alkoxy group. The most preferred silanes are those where R' and Y are selected from methyl and alkoxy groups, e.g., vinyltriethoxysilane, vinyltrimethoxysilane and methyl vinyl dimethoxysilane.

Preferably, the free radical initiator used to create the preferred silylated copolymers of the present invention is an organic peroxide compound having a half-life, at the reaction temperature, of less than one tenth of the reaction/residence time employed.

The term "surfactant" is meant to describe a surface active agent selected from cationic surfactants, anionic surfactants, amphoteric surfactants, nonionic surfactants, and mixtures thereof which stabilizes the dispersed phase of the emulsion. Each of these types of surfactants, which are known in the art as being useful in stabilizing emulsions of elastomeric polymers, whether individually or combined with another type of surfactant, are also useful as a surfactant in the instant invention.

Suitable cationic surfactants include, but are not limited to, aliphatic fatty amines and their derivatives such as dodecylamine acetate, octadecylamine acetate and acetates of the amines of tallow fatty acids; homologues of aromatic amines having fatty chains such as dodecylanaline; fatty amides derived from aliphatic diamines such as undecylimidazoline; fatty amides derived from disubstituted amines such as oleylaminodiethylamine; derivatives of ethylene diamine; quaternary ammonium compounds such as tallow trimethyl ammonium chloride, dioctadecyldimethyl ammonium chloride, didodecyldimethyl ammonium chloride and dihexadecyldimethyl ammonium chloride; amide derivatives of amino alcohols such as beta-hydroxyethylsteraryl amide; amine salts of long chain fatty acids; quaternary ammonium bases derived from fatty amides of disubstituted diamines such as oleylbenzylaminoethylene diethylamine hydrochloride; quaternary ammonium bases of the benzimidazolines such as methylheptadecyl benzimidazole hydrobromide; basic compounds of pyridinium and its derivatives such as cetylpyridinium chloride; sulfonium compounds such as octadecylsulfonium methyl sulfate; quaternary ammonium compounds of betaine such as betaine compounds of diethylamino acetic acid and octadecylchloromethyl ether; urethanes of ethylene diamine such as the condensation products of stearic acid and diethylene triamine; polyethylene diamines; and polypropanolpolyethanol amines.

Suitable anionic surfactants include, but are not limited to sulfonic acids and their salt derivatives such as described in U.S. Pat. No. 3,294,725 to Findley et al., which patent is hereby incorporated by reference. These anionic surfactants can be exemplified by, but are not limited to, alkali metal sulforicinates; sulfonated glycerol esters of fatty acids such as sulfonated monoglycerides of coconut oil acids; salts of sulfonated monovalent alcohol esters such as the sodium salt of oleylic acid isethionate; amides of ammo sulfonic acids such as the sodium salt of oleyl methyl tauride; sulfonated products of fatty acids nitrites such as palmitonitrile sulfonate; sulfonated aromatic hydrocarbons such as sodium alphanaphthalene monosulfonate and dibutyldodecylbenzenesulfonate (DBSA); condensation products of naphthalene sulfonic acids with formaldehyde; sodium octahydroanthracene sulfonate; alkali metal alkyl sulfates, such as sodium lauryl sulfate; ether sulfates having alkyl groups of 8 or more carbon atoms, alkylarylsulfonates having 1 or more alkyl groups of 8 or more carbon atoms and dialkylsulfonates, each alkyl group having 8 or more carbon atoms, such as dioctyl sulfosuccinate. Suitable amphoteric surfactants include, but are not limited to, lecithin, glycinates, betaines, sultaines and alkyl aminopropionates. These can be exemplified by cocoamphglycinate, cocoamphocarboxyglycinates, cocoamidopropylbetaine, lauryl betaine, cocoamido-propydroxy-siiltaine, laurylsulataine, and cocoamphodipropionate.

Useful nonionic surfactants may be exemplified, but not limited to, polyoxyalkylene alkyl ethers, polyoxyalkylene sorbitan esters, polyoxyalkylene alkyl esters, polyoxyalkylene alkylphenyl ethers, ethoxylated amides, ethoxylated amines, ethoxylated siloxanes, polyvinylacetate hydrolysate, polyvinylalchohol, polyglycerols, and block copolymers of propylene oxide and ethylene oxide and others. When nonionic surfactants are used in the present invention, polyoxyalkylene alkyl ethers are preferred. Representative examples of commercial polyoxyalkylene alkyl ethers, include Brij 30®, Brij 35®, and Brij 97® produced by Uniqema (ICI Surfactants, Wilmington, Del.) and mixtures thereof.

The surfactant can also be selected from the reaction products resulting from the reaction between a carboxylic acid functional hydrocarbon group and an amine functional hydrocarbon. The carboxylic acid functional hydrocarbon can be any hydrocarbon having a carboxylic acid group present in the molecule. The carboxylic acid functional hydrocarbon can be a linear or branched hydrocarbon, saturated or unsaturated, containing at least 4 carbon atoms in the molecule. Suitable carboxylic acid functional hydrocarbons include, but not limited to; monoprotic acids of the general formula RCOOH, where R represents a linear or branched hydrocarbon of containing 4 to 36 carbon atoms; ester containing monoprotic acids, such as adipic acid monoethyl ester, azelaic acid monomethyl ester; dimer acids, such as azelaci acid; trimer acids, such as the oligomeric product of unsaturated linear carboxylic acid containing at least 12 carbons, for example Empol 1043 (trimer acid of tall oil) or Empol 1045 (trimer acid of olelic acid) from Cognis Corporation (Cincinnati, Ohio). Preferably the carboxylic acid functional hydrocarbon is selected from the group of carboxylic acids commonly known as "fatty acids", that is, carboxylic acids derived from or contained in an animal or vegetable fat or oil. The fatty acids can be either saturated or unsaturated. Representative examples of fatty acids include, but not limited to; lauric, palmitic, stearic, isostearic acid, tall oil, oleic, linoleic, and linolenic. Most preferably, the carboxylic acid functional hydrocarbon is selected from fatty acids that are liquid at room temperature.

The amine functional hydrocarbon can be any hydrocarbon containing amine functionality within its molecule. Hydrophilic amine functional hydrocarbons are preferred, that is amine functional hydrocarbons that have some miscibility with water. Suitable hydrophilic amine functional hydrocarbons include, but not limited to; primary alcohol amines, such as ethanolamine; secondary amine alcohols such as diethanolamine; tertiary amine alcohols, such as triethanol amine; polyamines with hydrophilic groups such as polyethylene oxide groups. Preferably the hydrophilic amine functional hydrocarbon is a secondary amine alcohol, most preferably the hydrophilic amine functional hydrocarbon is diethanolamine.

The carboxylic acid functional hydrocarbon and amine functional hydrocarbon can be reacted together in any manner, but preferably they are reacted together prior to mixing with the curable elastomeric polymer to form the premix. The temperature and pressure at which the reaction step occurs is not critical, but generally is conducted at temperatures of 20 to 120° C., preferably 40 to 80° C., and at atmospheric pressure. The molar ratio of the carboxylic acid functional hydrocarbon to the amine functional hydrocarbon can vary, but typically is in the range of 3 to 0.33, preferably 2 to 0.5, and most preferably 1.5 to 0.8.

Generally, the amount of surfactant used should be that amount which stabilizes the emulsion of the curable elastomeric polymer. An amount from 3 to 30 parts by weight based on 100 parts by weight curable elastomeric polymer should be sufficient. Preferably, the surfactant is present in an amount from 5 to 15 parts by weight based on 100 parts by weight curable elastomeric polymer. More preferably, the surfactant is present in an amount from 5 to 10 parts by weight based on 100 parts by weight curable elastomeric polymer.

Component (C) is an internal cure additive. For the purpose of this invention, an internal cure additive is any material added to the premix composition for the purpose of initiating, causing, facilitating, or participating in the reaction with the functional groups present on the polymer in the premix that produces an elastomeric polymer upon cure. The term "internal cure" implies that the curing reaction with the functional groups on the elastomeric polymer may occur without requiring an external cure catalyst, co-catalyst, or additional curing agent. Preferably, the presence of an internal cure additive in the polymer and premix does not cause an immediate curing reaction to occur in the functional groups on the elastomers on contact. In other words, it is preferable that no curing or reaction between the polymer and the internal cure additive occurs while they are in the emulsion state. Thus, preferably the mixture of the internal cure additive and elastomeric polymer remains stable providing they remain in the internal phase of the emulsion.

The internal cure additive should cause a curing reaction of the elastomeric polymer upon heating or removal of external water. Typically, evaporating the water from the water continuous emulsion of the present invention at ambient temperature and conditions will cause curing and formation of the elastomeric polymer. Elevated temperatures, usually above the boiling point of water, will enhance the curing step.

Generally, the amount the internal cure additive should be that amount which causes a curing reaction of the elastomeric polymer upon heating or removal of external water. An amount from 0.5 to 50 parts by weight based on 100 parts by weight curable elastomeric polymer should be sufficient. Preferably, the internal cure additive is present in an amount from 3 to 30 parts by weight based on 100 parts by weight curable elastomeric polymer. More preferably, the internal cure additive is present in an amount from 3 to 20 parts by weight based on 100 parts by weight curable elastomeric polymer.

In a preferred embodiment, the internal cure additive is selected from carboxylic acid functional hydrocarbons when the elastomeric polymer is a silylated copolymer of an isomonoolefin and a vinyl aromatic monomer as described in U.S. Pat. No. 6,177,519 B1, which is hereby incorporated by reference. The carboxylic acid functional hydrocarbon can be any hydrocarbon having one or more carboxylic acid group present in the molecule. The carboxylic acid functional hydrocarbon can be a linear or branched hydrocarbon, saturated or unsaturated, alkyl or aryl, containing at least 4 carbon atoms in the molecule. Illustrative examples of hydrocarbons having one carboxylic acid include, but not limited to, butyric acid, isobutyric acid, pivalic acid, pyruvic acid, crotonic acid, isovaleric acid, 2-ethylbutanoic acid, hexanoic acid, heptanoic acid, 2-ethylhexanoic acid, cyclohexanecarboxylic acid, nonanoic acid, decanoic acid, myristic acid, palmitic acid, oleic acid, and stearic acid. Illustrative examples of hydrocarbons having two carboxylic acid groups include, but not limited to, succinic acid, glutaric acid, adipic acid, pimelic acid, suberic acid, azelaic acid, sebacic acid. Illustrative examples of hydrocarbons having three carboxylic acid groups include oligomeric products of unsaturated linear carboxylic acid, for example Empol 1043 (trimer acid of tall oil) or Empol 1045 (trimer acid of olelic acid) from Cognis Corporation (Cincinnati, Ohio). Halogen-substituted carboxylic acids include, but not limited, chlorobenoic acid, bromobenzoic acid, fluorobenzoic acid, chlorophenoxyacetic acid. Nitro- and amino-carboxylic acids include, but not limited to, aminobenzoic acid, nitrophenylacetic acid. Preferably the carboxylic acid functional hydrocarbon is selected from the group of carboxylic acids commonly known as "fatty acids", that is, carboxylic acids derived from or contained in an animal or vegetable fat or oil. The fatty acids can be either saturated or unsaturated. Representative examples of fatty acids include, but not limited to; lauric acid, palmitic acid, stearic acid, isostearic acid, tall oil acid, oleic acid, linoleic acid, and linolenic acid. Most preferably, the carboxylic acid functional hydrocarbon is isostearic acid.

The cure process can be enhanced by the addition of other components to the aqueous phase of the emulsion. For example, in the case of alkoxysilyl-functional elastomeric polymers, it may be desirable to adjust the pH of the water continuous phase to be below 5 by adding a trace amount of acid, or to above 9 by incorporating a trace amount of base. In the case of alkoxysilyl-functional elastomeric polymers, this pH range will enhance the condensation reaction of the alkoxysilyl-functional groups.

The addition of a carboxylic acid hydrocarbon compound to alkoxysilyl-functional elastomeric polymer can provide a stable emulsion with "self-curable" characteristics upon heating or removal of water without needing an external catalyst or curing agent. Specifically, a fatty acid such as isostearic acid, or tall oil can be incorporated into a dimethoxysilyl-functional poly(isobutylene-co-para-methylstyrene) to provide a stable emulsion that upon drying yields a smooth, continuous film coating which can be cured into a cured film with excellent elastomeric property upon heating.

The curable elastomeric polymer, surfactant, and the internal cure additive can be mixed in the presence or absence of solvents to form a premix. If the premix is formed in the absence of solvents, it can be considered to be essentially free of organic solvents. As used herein, the phrase "essentially free of organic solvents" means that solvents are not added to the curable elastomeric polymer and surfactant premix in order to create a mixture of suitable viscosity that can be processed on typical emulsification devices. More specifically, "organic solvents" as used herein is meant to include any water immiscible low molecular weight organic material added to the non-aqueous phase of an emulsion for the purpose of enhancing the formation of the emulsion, and is subsequently removed after the formation of the emulsion, such as evaporation during a drying or film formation step. Thus, the phrase "essentially free of organic solvent" is not meant to exclude the presence of solvent in minor quantities in process or emulsions of the present invention. For example, there may be instances where the elastomeric polymer or surfactant used in the premix composition contains minor amounts of solvent as supplied commercially. Small amounts of solvent may also be present from residual cleaning operations in an industrial process. Furthermore, small amounts of solvent may also be added to the process of the present invention for purposes other than to enhance the formation of the water-continuous emulsion. Preferably, the amount of solvent present in the premix should be less than 5% by weight of the premix, more preferably the amount of solvent should be less than 2% by weight of the premix, and most preferably the amount of solvent should be less than 1% by weight of the premix.

Illustrative examples of "organic solvents" that are included in the above definition are relatively low molecular weight hydrocarbons having normal boiling points below 200° C., such as alcohols, ketones, ethers, esters, aliphatics, alicyclics, or aromatic hydrocarbon, or halogenated derivatives thereof.

As merely illustrative of solvents to be included in the definition of "organic solvents", there may be mentioned butanol, pentanol, cyclopentanol, methyl isobutyl ketone, secondary butyl methyl ketone, diethyl ketone, ethyl isopropyl ketone, diisopropyl ketone, diethyl ether, secbutyl ether, petroleum ether, ligroin, propyl acetate, butyl and isobutyl acetate, amyl and isoamyl acetate, propyl and isopropyl propionate, ethyl butyrate, pentane, hexane, heptane, cyclopentane, cyclohexane, cycloheptane, methylene chloride, carbon tetrachloride, hexyl chloride, chloroform, ethylene dichloride, benzene, toluene, xylene, chlorobenzene, and mixtures thereof with each other and/or more water soluble solvents.

A plasticizer (E) may be added as an optional component to the premix. As used herein, "plasticizer" is meant to describe any additive to the premix added for the purpose of enhancing the mixture of the surfactant with the elastomeric polymer. Generally, the plasticizer should be compatible and miscible with the elastomeric polymer and has one or more of the following effects on the elastomeric polymer: reduces the viscosity of polymer, renders the polymer flexible and easier to process, lowers the softening temperature, or increases the melt-flow characteristics. Addition of plasticizer is usually intended to reduce the viscosity and rigidity, and enhance the processing of the polymer.

Generally, the plasticizer can be selected from saturated or unsaturated hydrocarbons containing at least 8 carbon atoms. Illustrative examples of plasticizers useful in the present invention include, but are not limited to: alkanes, for example straight, branched, or cyclic aliphatic hydrocarbons having the formula $C_nH_{2n+2}$; alkenes and alkynes; for example, unsaturated hydrocarbons having chain length of at least C8, aromatic hydrocarbons, including alkylaryl hydrocarbons: cycloparaffinic compounds and varieties of aromatic- and naphthenic-containing compounds; halogenated alkanes or halogenated aromatic hydrocarbons: such as chlorinated, brominated derivatives of alkanes, halogenated aromatic or alkylaryl hydrocarbons, alkanes or aromatic hydrocarbons in which some of the hydrogens are replaced by halogens such as chlorine, or bromine atoms; esters of carboxylic acids and phosphoric acids: such as isodecyl pelargonate, dibutyl phthalate, dioctyl phthalate, diisodecyl phthalate, diisooctyl adipate, diisodecyl adipate, butyl benzyl phthalate; phosphates and polyesters: such as low to moderate molecular weight esterification products from acids, anhydrides, diacids, phosphates such as 2-ethylhexyl diphenyl phosphate, tricresyl phosphate, cresyl diphenyl phosphate; low and moderate molecular-weight elastomeric polymers or oligomers, such as oligomeric materials or low to moderate molecular-weight polymers of similar structure to the elastomeric polymers exhibit excellent miscibility and compatibility with the elastomeric polymers, for example, low molecular weight polyisobutylene, and polybutene as plasticizer for poly-isobutylene or poly(isobutylene-co-p-methylstyrene) elastomers; Polyglycols, Polyols, polyalkyl glycols, polyalkylene glycols, ethers, and glycolates: such as butyl phthalyl butyl glycolate, methyl phthalyl ethyl glycolate; Sulfonamides and cyanamides: such as cyclohexyl-p-toluenesulfonamide, N-ethyl-p-toluenesulfonamide, p-toluenesulfonamide: Hydrophilic plasticizers, such as polyvinyl alcohol, poly(vinyl acetate) and partially hydrolyzed; Terpene hydrocarbons such as terpentine, pinene, dipentene, terpineol, pine oil.

Generally, the plasticizer is selected from compounds having a chemical structure that is similar to the chemical structure of the curable elastomeric polymer to be emulsified. For example, saturated hydrocarbons such as mineral oil, or low molecular weight isobutylenes would be preferred plasticizers when the curable elastomeric polymer is a polyisobutylene.

The amount of plasticizer added to the premix can vary, but generally ranges from 0.1 to 100 parts by weight to 100 parts of the curable elastomeric polymer, preferably 0.1 to 50, and most preferably ranges from 0.1 to 30 parts by weight to 100 parts of the curable elastomeric polymer.

A low molecular weight acid (F) can also be added to the premix as an optional component. The addition of the low molecular weight acid is preferable when a silylated copolymer of isomonoolefin and a vinyl aromatic monomer is used as the curable elastomeric polymer to be emulsified, and in particular when the silylated group comprises an alkoxy group. Although not to be limited by any theory, the present inventors believe the low molecular weight acid helps to minimize hydrolysis of the alkoxy silane present on the copolymer during the emulsification process.

The water-continuous emulsions of the curable elastomeric polymer can be characterized as having an average particle size distribution of less than 5 $\mu$m, with a solids content of greater than 75%, and are able to produce stable water-continuous emulsions upon further dilution with water. Average particle size distribution is the accepted meaning in the art, and can be determined for example using a Malvern Mastersizer unit. "Solids content" is also the accepted meaning in the art, that is the weight percent of all non-aqueous components added to the emulsion. For purposes of this invention, "stable water-continuous emulsion" means that the emulsion's average particle size distribution does not change substantially within a given period of time, for example the average particle size remains less than 5 $\mu$m and no significant formation of particles larger than 5 $\mu$m occurs within a time period of 4 months. Thus, mixing additional water to the high solids content water-continuous phase emulsion forms a diluted emulsion having stability of at least 4 months. The water-continuous emulsions of curable elastomeric polymers having a solids content greater than 75% can be diluted to water-continuous emulsions having a solids content as low as 5%, preferably the solids content upon dilution is 5 to 75% and most preferably from 30 to 75%.

Illustrative, non limiting examples of low molecular weight acids suitable in the present invention are: inorganic acids such as hydrochloric acid, sulfuric acid, phosphoric acid, and the like; and also organic acids such as carboxylic acid functional hydrocarbons containing 1 to 8 carbon atoms, for example, formic acid, acetic acid, propionic acid, maleic acid, fumaric acid, and the like. Preferably the low molecular weight acid is acetic acid.

The amount of low molecular weight acid added to the premix can vary, but generally ranges from 0.01 to 10 parts by weight to 100 parts of the curable elastomeric polymer, preferably, 0.01 to 5, and most preferably ranges from 0.01 to 3 parts by weight to 100 parts of the curable elastomeric polymer.

The present invention also relates to a process for preparing a water-continuous emulsion of a curable elastomeric polymer comprising:
(I) forming a premix comprising;
(A) 100 parts of a curable elastomeric polymer having a viscosity of 0.5 to 1,000,000 KPa-s and a glass transition temperature up to 50° C.,
(B) 3 to 30 parts of a surfactant,
(II) adding
(C) 5 to 45 parts water to the premix with mixing thereby forming a water-continuous emulsion of the curable elastomeric polymer having a solids content of greater than 75%, an average particle size less than 5 $\mu$m, and having sufficient stability to produce a stable lower solids emulsion upon dilution with water.

The curable elastomeric polymer, surfactant, plasticizer, and low molecular weight acid are the same as defined above.

The formation of the premix in step (I) comprising the curable elastomeric polymer, surfactant, optional plasticizer, and optional low molecular weight acid can be accomplished by any method known in the art to effect mixing of high viscosity materials. The mixing of the premix components can occur either as a batch, semi-continuous, or continuous process whereby the mixing is provided by means known in the art to mix high viscosity materials, for example, batch mixing equipments with medium/low shear include change-can mixers, double-planetary mixers, conical-screw mixers, ribbon blenders, double-arm or sigma-blade mixers; batch equipments with high-shear and high-speed dispersers include those made by Charles Ross & Sons (NY), Hockmeyer Equipment Corp. (NJ); batch equipments with high shear actions include Banbury-type (CW Brabender Instruments Inc., NJ) and Henschel type (Henschel mixers America, TX). Illustrative examples of continuous mixers/compounders include extruders single-screw, twin-screw, and multi-screw extruders, twin-screw corotating extruders, such as those manufactured by Krupp Werner & Pfleiderer Corp (Ramsey, N.J.), and Leistritz (NJ); twin-screw counter-rotating extruders, two-stage extruders, twin-rotor continuous mixers, dynamic or static mixers or combinations of these equipments. Furthermore, one may be able to mix curable elastomeric polymers of relatively low viscosity in such conventional emulsification equipments as rotor-stator, colloid mills, homogenizers, and sonolaters.

The temperature and pressure at which the mixing occurs to effect the formation of the premix is not critical, but generally is conducted at ambient temperature and pressures. Typically, the temperature of the mixture will increase during the mixing process due to the mechanical energy associated with shearing such high viscosity materials. Thus, lower shear rates will cause less of a temperature increase. Preferably the temperature is controlled to be below 60° C. to minimize undesirable side reactions.

The temperature increase in the mixture will also depend on the type of mixing equipment used, high shear mixing generally results in high temperature build up. Also, the longer durations of mixing time will result in greater temperature increases. While the temperature of the operation is not necessarily critical for forming emulsions of conventional curable elastomeric polymers, in other instances it may be desirable to control the temperature to be below 60° C. Therefore, the preferred mixing equipments for forming the premix of the curable elastomeric polymers are those batch equipments with medium to low shear rate such as Double-planetary mixers, low intensity, low-shear rate change-can mixers, and batch mixers equipped with high viscosity mixing capability or blades; and the preferred continuous mixers include twin-screw extruders, corotating or counter-rotating, single, two- or multi-stage extruders where the mixing times are relatively short.

The second step of the process involves adding 5 to 45 parts water to the premix with mixing to form a water-continuous emulsion of the curable elastomeric polymer having an average particle size less than 5 $\mu$m and having sufficient stability to produce a stable lower solids emulsion upon dilution with water.

The amount of water added can vary from 5 to 45 parts per 100 parts by weight of the premix. The water is added to the premix at such a rate so as to form a stable high solids emulsion of the curable elastomeric polymer. While this amount of water can vary depending on the selection of the curable elastomeric polymer and surfactant, generally the amount of water is from 5 to 45 parts per 100 parts by weight of the premix, and more preferably is from 5 to 30 parts per 100 parts by weight of the premix, and most preferably is from 5 to 20 parts per 100 parts by weight of the premix.

In a preferred embodiment, the water is added to the premix in incremental portions, whereby each incremental portion comprises less than 8 weight % of the premix and each incremental portion of water is added successively to the previous after the dispersion of the previous incremental portion of water, wherein sufficient incremental portions of water are added to form the water-continuous emulsion of the curable elastomeric polymer. The present inventors have unexpectedly found this stepwise addition of water in small incremental portions allows for the formation of the emulsion and greatly enhances the emulsion stability at relatively high solids contents. Each incremental addition of water is added to the premix and dispersed. Before adding the next incremental portion of water, the previous incremental portion should have been dispersed, meaning that no visible water droplets were present in the mixture. Preferably, the successive incremental portion of water comprises less than 4 weight % of the premix, and most preferably comprises less than 2 weight % of the premix.

Although not to be limited by any theory, the present inventors believe the total amount of water added in incremental portions, according to the preferred embodiment of the present invention, represents the amount of water necessary to cause a phase inversion from a non-aqueous continuous mixture to a water-continuous emulsion. This point is evidenced by the physical changes of the mixture that accompany this particular stage of the process. These physical changes include the emulsion's ability to be readily diluted in water, and also the creamy/lustrous appearance of the water-continuous emulsion.

Water is added to the premix with mixing to form the water-continuous emulsion of the curable elastomeric polymer. The mixing methods in step (II) can be accomplished by the same or different mixing methods as in step (I). Preferably, the mixing methods for the water addition in step (II) is the same as the mixing methods used to form the premix in step (I).

Illustrative of the batch mixers and conditions that can be used to accomplish the mixing of the water with the premix in step (II), or premix formation of step (I) of the present invention include but are not limited to: Ross mixers with HV blades (Charles Ross & Sons, NJ), a low speed, high power mixing device operating at a very low shear rate of 1 sec-1 to 7 sec-1 (10 rpm–70 rpm); Ross Powermix, a mixing and compounding device having two mixing blades, one scraper blade operating a low shear rate of 2.4 sec-1 to 7 sec-1 (24–70 rpm) and a high speed disperser delivering a shear rate range of 115–345 sec-1 (1150–3450 rpm); Turello mixer (Turello Manufacturer: Construzioni Meccaniche, Zona Artigianale, Via Dei Ponti, Spilimbergo), a mixing and compounding device having two mixing blades, one mixing blade operating at a low shear rate of 2 sec-1 to 6 sec-1 (20–60 rpm), and the other two high speed dispersers delivering a shear rate range of 30 sec-i to 310 sec-1 (300 rpm to 3000 rpm); Hauschild mixer (Hauschild universal mixer: Hauschild mixer, model AM 501, Waterkamp 1, 59075 Hamm, Germany; supplied through Flacteck, Landrum S.C.), a rotational mixing device operating at a fixed shear rate of 1032 sec-1 or 3000 rpm.

The mixing methods used in step (II), or premix formation of step (I) of the present invention can also be accomplished by a continuous process such as an extruder. A twin screw co-rotating fully inter-meshing extruder, 2-lobe, 3-lobe or greater screw elements (multi-lobe elements) with high length to diameter (L/D) is particularly useful for the process of the present invention because of its flexibility in allowing multiple additions of water at controlled quantities at selected locations and its ability to effectively disperse water quickly via dispersive and shear mixing.

When a twin screw co-rotating extruder is used for mixing in the present invention, sufficient mixing can be accomplished through screw configuration design, selection of water injection ports along the extruder, and the control of screw operating conditions. An effective screw configuration suitable for continuous emulsification process requires choices of screw elements and proper configuration of such screw elements in such order that the completed screw configuration may cause desirable dispersion and distribution of water into the premix. There are many commercially available screw elements which may be selected for constructing a useful screw configuration. Illustrative examples of such screw elements include; medium/wide discs kneading blocks for dispersive shearing mixing, screw mixing elements and turbine mixing elements for mixing action, and screw bushings for conveying purposes. There are many variations among each type of screw elements. For example, there are wide discs, medium discs, thin discs, and discs in neutral, right handed and left handed directions for the kneading blocks type alone, and 2-lobe or 3-lobe screw elements. For those skilled in the art, it should be obvious that by properly combining different type of screw elements and in certain orders one can devise screw configurations to perform desirable shear and mixing means at specific segments of the extruder. One skilled in the art can further develop a process where low viscosity surfactants and water may be incorporated into the curable elastomeric polymer at selected injection ports along the extruder where the water and surfactants may be effectively dispersed prior to the next water injection, to provide the preferred amounts and rates of water addition in accordance with the present invention.

The temperature and pressure at which the water addition step (II) occurs is not critical, but preferably mixing is conducted at ambient temperature and pressures. Typically, the temperature of the mixture will increase during the mixing process due to the mechanical energy associated with shearing such high viscosity materials. Thus, lower shear rates will cause less temperature increases. The temperature increase in the mixture will also depend on the type of mixing equipment used, high shear mixer generally results in high temperature build up, so does the longer the mixing time. While the temperature of the operation is not necessarily critical for conventional curable elastomeric polymers, it is important to keep the temperature build-up low during the mixing. Preferably the temperature for the water mixing is controlled to be below 60° C. Therefore, the preferred mixing equipments for forming the emulsion of the curable elastomeric polymers are those batch equipments with medium to low shear rate such as Double-planetary mixers, low intensity, low-shear rate change-can mixers and batch mixers equipped with high viscosity mixing capability or blades; and the preferred continuous mixers include twin-screw extruders, co-rotating or counter-rotating, single, two- or multi-stage extruders where the mixing times are relatively short.

Other optional ingredients may be added to the water continuous emulsions of the present invention as desired to affect certain performance properties, providing the nature and/or quantity of these optional ingredients does not substantially destabilize the water-continuous emulsions of the present invention. These optional ingredients include, fillers, freeze-thaw additives such as ethylene glycol or propylene glycol, antimicrobial preparations, UV filters, antioxidants, stabilizers, pigments, dyes, and perfumes.

The emulsions of the present invention are useful in coating applications requiring no or little presence of organic solvents. In particular, the emulsions of the present invention are useful in those coating applications requiring flexible film formation with improved water resistance or gas/vapor permeability.

EXAMPLES

The following examples are presented to further illustrate the compositions of this invention, but are not to be considered as limiting the invention, which is delineated in the appended claims.

The particle size of the emulsion was determined using a Malvern Mastersizer S unit. The unit was equipped with 300RF mm range lens capable of detecting a particle size range from 0.05 $\mu$m to 900 $\mu$m. The data was analyzed using a polydisperse model and calculated per the Fraunhofer model. The results from these measurements are reported herein as;

D(v, 0.5), the size value of particle at which 50% of the sample is smaller and 50% is larger than this value. This value is defined as the average particle size of the emulsion sample in this invention, also known as the mass median diameter.

D(v, 0.9), the size value of particle for which 90% of the sample is below this size.

Span, the measurement of the width of the distribution. It is calculated as the ratio of the difference between D(v, 0.9) and D(v, 0.1) to D(v, 0.5). The smaller the value, the narrower the particle size distribution.

The "zero-shear" viscosity of silylated elastomeric polymers in this invention were either experimentally derived or adopted from available commercial literatures. To derive the zero-shear viscosity of a silylated elastomeric polymer, the apparent viscosity of the elastomer at different shear rates (1/sec) or angular frequencies (rad/sec) were measured on a shear stress rheometer at 25° C. A CSL 500 Rheometer from TA Instruments Inc., (New Castel, Del.) (also known under Cari-Med Rheometer) was used to carry out the measurements. A variety of sample geometries were used to in order to carry out the viscosity measurements. For high viscosity polymers, cone and plate and parallel plate at selected diameters were used. For example, the 2 cm diameter cone and plates were used for very high viscosity polymers and the 6 cm diameter cone and plates for moderately low viscosity polymers. The cone and plate was used for homogeneous materials and emulsions with sub-micrometer ($\mu$m) particles, and parallel plate geometry was used for particulate containing or multi-component mixtures. Additionally, the cone and plate geometry was used for highly shear rate sensitive materials.

When an extruder was used for mixing and forming the emulsions, a modular 25 mm co-rotating, fully intermeshing twin-screw extruder manufactured by Krupp Werner & Pfleiderer Corporation (Ramsey, N.J.) was used. The extruder was powered by a 21.5 KW AC motor with a Flux Vector Drive capable of generating screw speeds of up to 1200 rpm. The diameter of each screw was 25 mm and the channel depth was 4.15 mm. The free space cross sectional area was 3.2 cm$^2$. The overall length to diameter ratio L/D of the machine was 56:1. The extruder module had 14 barrels with one injection port on each barrel. The polymer was fed to the extruder via a single screw Bonnot Extruder and the screw was tapered to ensure accurate flow control and delivery. Additives, surfactants, acid, and water were delivered to the extruder via precision pumps and flow control valves to selected ports on the extruder.

Example 1

Two commercial samples of a dimethoxymethylsilyl-terminated polypropyleneoxide polyether (Si-PPO), MS203H having a viscosity of 16 Pa-s and MS303H having a viscosity of 26 Pa-s, both from Kaneka Corporation (Kanegafuchi Chemical Industry Co. Ltd. Tokyo, Japan and Kaneka America Corp, New York, N.Y.) were used to prepare mixtures of elastomeric polymers for emulsification. These dimethoxymethylsilyl-terminated polypropyleneoxide polyethers were mixed with two types of dimethoxysilyl-functional elastomers: a dimethoxylsilyl-functional poly(isobutylene-co-para-methylstyrene) copolymer (Si-P(IB-co-pMS)) prepared according to the procedures detailed in U.S. Pat. No. 6,177,519 and having a viscosity of 0.15 KPa-s (1.5 M poise); and Epion 300S a dimethylsilyl-terminated polyisobutylene (Si-PIB) having a weight-average molecular weight of 12,600 g/mole, a number-average molecular weight of 10,000 g/mole, and a viscosity of 1.6 KPa-s, obtained commercially from Kaneka Corporation.

The Si-P(IB-co-pMS) copolymer used (16854-94G) in this example contained 7.5% of para-methylstyrene in the copolymer, having a weight average molecular weight of 67,740 g/mole, a number average molecular weight of 31,400 g/mole and a viscosity of 0.21 KPa.s (2.1 M poise).

A homogeneous mixture of Si-PIB polymer and Si-PPO polymer was first prepared by mixing the polymers in a bench-top Hauschild universal mixer. Emersol 873 (Cognis Corp, Cincinnati, Ohio) isostearic acid was incorporated with further mixing to form a uniform mixture. Brij 35L, Brij 97 (ICI Surfactants, Uniqema, Wilmington, Del.), and acetic acid were subsequently mixed in to yield a uniform premix. To effect the emulsification, multiple water additions, each at 0.5 g aliquots were made to the premix, followed by shear mixing at 3000 rpm to disperse the water into the premix. The water additions were repeated until a water continuous emulsion was formed. Additional water was added to dilute the emulsion to desirable % solids level. The resulting emulsions were a fine smooth emulsion having an average particle size of 0.472 micrometers and 0.36 micrometers, respectively, as summarized in Table 1.

Thus, emulsions of silane-functional curable elastomeric emulsions consisting of isostearic acid curing agent with mixture dimethoxysilyl-functional silane-grafted poly(isobutylene-co-p-methylstyrene) and silyl-functional polyether were successfully prepared. A water-continuous and water-dilutable emulsion at 94.0 wt. % solids was formed and was dilutable to a weight % solids of 75.0 or higher. The emulsions had excellent sub-micron particle size profile, as shown in Table 1.

TABLE 1

| Run # | 1 | 2 |
|---|---|---|
| SiPIB polymer type | Si-P(IB-co-pMS) | Epion 300S |
| Si-PPO polymer type | Kaneka MS S303H | Kaneka MS S203H |
| SiPIB polymer amount | 20.0 g | 20.0 g |
| Si-PPO polymer amount | 20.0 g | 20.0 g |
| Emersol 873 isostearic acid | 4.0 g | 4.0 g |
| Brij 35L (72% solids) | 3.0 g | 3.0 g |
| Brij 97 | 1.4 g | 1.4 g |
| Acetic acid | 0.12 g | 0.12 g |
| Water for emulsification (0.5 g each addition) | 7.0 g | 2.0 g |
| D.I. Water, dilution | 8.2 g | 9.9 g |
| Wt. % solids at formation | 86.0 | 94.0 |
| Wt. % solids, final | 75.0 | 79.0 |
| Particle size profile, initial | | |
| D(v, 0.5), micrometers | 0.473 | 0.36 |
| D(v, 0.9), micrometers | 1.83 | 0.67 |
| Span | 3.61 | 1.27 |

Example 2

Emulsions of selected silane-grafted poly(isobutylene-co-p-methylstyrene) (Si-P(TB-co-pMS)) were prepared on a twin-screw extruder, as summarized in Table 2. The Si-P(IB-co-pMS) copolymer for these examples contained about 7.5 wt. % para-methylstyrene units in the copolymer, having a weight-average molecular weight of 72,940 g/mole, a number-average molecular weight of 25,360 g/mole, and a zero-shear viscosity of 100 KPa.s (1.0 M poise). The selected silane-grafted poly(isobutylene-co-p-methylstyrene) (Si-P(IB-co-pMS)) was incorporated with a selected amount of isostearic acid (ISA) to form a uniform mixture. To this, the mixture of the selected surfactants and acetic acid was incorporated and uniformly dispersed into the polymer via effective shearing and mixing of twin-screw extruder screw units to produce a polymer premix containing the silane-grafted elastomeric polymer, isostearic acid, acetic acid and surfactants. To prepare the high solids emulsion of this self-curable elastomeric polymer, water at prescribed weight % to the polymer premix was introduced through pre-selected injection ports and barrels. The water was fully incorporated into the polymer premix by means of dispersive and distributive mixings before the introduction of the next water addition. The amount of water as well as the water in weight % of the polymer premix for each of four water addition ports is shown in Table 2. Emulsions of sub-micron particle size and wt. % solids of 80% and higher were prepared.

TABLE 2

| Run # | 3 | 4 | 5 | 6 | 7 |
|---|---|---|---|---|---|
| Si-P(IB-co-pMS) polymer, g/min | 226.8 | 202.5 | 180 | 180 | 180 |
| Isosteraic acid, g/min | 25.2 | 22.5 | 20 | 20 | 20 |
| Acetic acid, g/min | 0.7 | 0.7 | 0.54 | 0.54 | 0.59 |
| Brij 35L (72%), g/min | 17.0 | 17.0 | 13.2 | 13.2 | 14.5 |
| Brij 97, g/min | 8.0 | 8.0 | 6.3 | 6.3 | 6.9 |
| water 1, g/min | 6.0 | 6.0 | 5.0 | 5.0 | 5.0 |
| water 2, g/min | 7.0 | 8.0 | 7.0 | 7.0 | 7.0 |
| water 3, g/min | 7.0 | 8.0 | 8.0 | 8.0 | 8.0 |
| water 4, g/min | 30.0 | 30.0 | 25.0 | 25.0 | 25.0 |
| Total amount, g/min | 327.7 | 302.7 | 265.0 | 265.0 | 267.0 |
| Water rate 1, wt. %/premix | 2.2 | 2.4 | 2.3 | 2.3 | 2.3 |
| Water rate 2, wt. %/premix | 2.6 | 3.3 | 3.2 | 3.2 | 3.2 |
| Water rate 3, wt. %/premix | 2.6 | 3.3 | 3.7 | 3.7 | 3.7 |
| Water rate 4, wt. %/premix | 11.0 | 12.2 | 11.6 | 11.6 | 11.5 |
| Screw speed, rpm | 500 | 500 | 300 | 500 | 800 |
| shear rate, sec-1 | 157.0 | 157.0 | 94.2 | 157.0 | 251.2 |
| Wt. % solids | 83.3 | 81.2 | 81.6 | 81.6 | 81.6 |
| particle size profile | | | | | |
| D(v, 0.5), micrometers | 0.556 | 0.729 | 0.584 | 0.614 | 0.567 |
| D(v, 0.9), micrometers | 1.79 | 1.92 | 1.74 | 1.78 | 1.67 |
| Span | 2.96 | 2.32 | 2.73 | 2.64 | 2.69 |

| Run # | 8 | 9 | 10 | 11 | 12 |
|---|---|---|---|---|---|
| Si-PIB polymer, g/min | 180 | 164 | 164 | 164 | 164 |
| Isosteraic acid, g/min | 20 | 16.4 | 16.4 | 16.4 | 16.4 |
| Acetic acid, g/min | 0.59 | 0.54 | 0.59 | 0.59 | 0.54 |
| Brij 35L (72%), g/min | 14.5 | 13.2 | 14.5 | 14.5 | 13.2 |
| Brij 97, g/min | 6.9 | 6.3 | 6.9 | 6.9 | 6.3 |
| water 1, g/min | 5.0 | 5.0 | 5.0 | 5.0 | 5.0 |
| water 2, g/min | 7.0 | 7.0 | 7.0 | 7.0 | 7.0 |
| water 3, g/min | 8.0 | 8.0 | 8.0 | 8.0 | 8.0 |
| water 4, g/min | 25.0 | 25.0 | 25.0 | 10.0 | 25.0 |
| Total amount, g/min | 267.0 | 245.4 | 247.4 | 232.4 | 245.4 |
| Water rate 1, wt. %/premix | 2.3 | 2.5 | 2.5 | 2.5 | 2.5 |
| Water rate 2, wt. %/premix | 3.2 | 3.6 | 3.5 | 3.5 | 3.6 |
| Water rate 3, wt. %/premix | 3.7 | 4.1 | 4.0 | 4.0 | 4.1 |
| Water rate 4, wt. %/premix | 11.5 | 12.7 | 12.6 | 5.1 | 12.7 |
| Screw speed | 300 | 300 | 800 | 300 | 500 |
| shear rate, sec-1 | 94.2 | 94.2 | 251.2 | 94.2 | 157.0 |
| Wt. % solids | 81.6 | 80.2 | 80.2 | 85.3 | 80.2 |
| particle size profile | | | | | |
| D(v,0.5), micrometers | 0.672 | 0.732 | 0.45 | 0.667 | 0.582 |
| D(v, 0.9), micrometers | 1.89 | 2.01 | 1.51 | 1.91 | 1.73 |
| Span | 2.54 | 2.48 | 3.09 | 2.6 | 2.72 |

Example 3

The silane-grafted P(IB-co-pMS) polymer for the following examples was a dimethoxysilyl-grafted poly(isobutylene-co-p-methylstyrene) having a weight-average molecular weight of 66,200 g/mole, number-average molecular weight of 28,900 g/mole, and a viscosity of about 0.16 KPa.s (1.6 M poise). Emulsions, runs 13 and 14 were prepared in a Ross Mixer using the following procedure as detailed for run 14.

A 1-quart Ross mixing vessel was charged with 625 g of the silane-grafted poly(isobutylene-co-paramethylstyrene). The polymer was heated to and held at 50° C. for 2 hours, then 31.5 g of isostearic acid was added and mixed to form a homogeneous mixture with a set of high viscosity blades turning at about 15 rpm speed. This yielded a shear dispersion action at a shear rate of about 1.5 sec-1. The heat was turned off to allow the mixture returned to ambient temperature. A surfactant mixture consisting of 56 g of Brij 35L (@ 72% solids) 26 g of Brij 97, and 2.0 g of acetic acid was charged to the polymer mixture. The shear dispersion mixing resumed at about 15–20 rpm for two more hours. A homogeneous mixture of polymer/surfactants was obtained under this very low shear rate of 1.5 to 2.0 sec-1.

To carry out the emulsification, a small amount of de-ionized water was charged while the above polymer/surfactants mixture under steady shear mixing. The process began by adding 12 g of de-ionized water (equivalent of 1 to 1.5 wt. % per polymer/surfactants mixture) was incorporated into the above polymer/surfactants mixture while under a steady shear dispersing mixing with the HV blades turning at about 20 rpm (or a shear rate of 2 sec-1). The mixing continued until the water was fully incorporated into the mixture, typically about 10–15 minutes. A next water addition of 12–18 g quantity (approximate 1 to 2 wt. % of polymer/surfactants mixture) was introduced while the shear mixing action continued. No subsequent water addition was allowed until the previous water was fully incorporated. This gradual incorporation of water in small intervals continued while the mixture is under efficient shear dispersion mixing. When the total amount of de-ionized water was successfully incorporated, a water-dilutable, emulsion was formed. This water-dilutable, smooth and creamy emulsion had a solids content of 80.0 wt. %. This high solids emulsion had an average particle size of 0.66 micrometers (D(v, 0.5)), 1.90 micrometers at 90 percentile (D(v, 0.9)), and a span of 2.61.

To check the self-cure property, the prepared emulsion was cast on a thin aluminum container and dried in 150 C oven for 40 minutes. The dried film property was examined. The one without isostearic acid internal cure additive felt gummy, and had no characteristics of a cured elastomer; the one contained isostearic acid felt cured and elastic.

TABLE 3

| Run # | 13 | 14 |
|---|---|---|
| Si-grafted P(IB-co-pMS) | 650 g | 625 g |
| Isostearic acid | 0 g | 31.5 g |
| Brij 35L (72% solids) | 71 g | 56 g |
| Brij 97 | 40 g | 26 g |
| Acetic acid | 2.0 g | 2.0 g |
| D.I. Water | 109 g | 163 g |
| Wt. % solids | 85.0 | 80.0 |
| Ph @ 25 C. | 4.479 | 4.625 |
| Particle size, Malvern | | |
| D(v, 0.5), micrometers | 0.589 | 0.66 |
| D(v, 0.9), micrometers | 3.5 | 1.9 |
| Span | | 2.61 |
| Dried film property | No cure | Cured, elastomeric |

Example 4

Two high solids water-continuous emulsions of various silylated copolymers of isobutylene and methyl styrene (PIB-co-pMS) polymers were prepared. The Mn, Mw, %Si, and viscosities of these four silylated PIB polymers are summarized in the following table. These silylated PIB polymers were prepared according to the procedures detailed in U.S. Pat. No. 6,177,519.

The following general procedure was used for both runs: one without internal cure additive and one with isostearic acid as internal cure additive. The compositions and resulting emulsion properties for these two runs are summarized in Table 4.

A 1 gallon Ross mixer equipped with double planetary mixer blades was charged with 2500 g of a dimethoxymethylsilyl-functional poly(isobutylene-co-paramethylstyrene) and heated at 50° C. for 2 hours. Then, 375 g of a hydrocarbon oil, Daphne KP-100 (formula weight 490 g/mole, Apollo America Corp.) was added with at an agitation speed of about 15–25 rpm (about a shear rate of 1.5 to 2.5 sec-1) and mixed for 2 hours to produce a homogeneous mixture. To this mixture was added a mixture of 80 g of Brij 30, 120 g of Brij 35L (@72% solids), 120 g of Brij 97, (ICI Surfactants, Uniqema, Wilmington, Del.) and 7.5 g of acetic acid at a mixing speed of 15–25 rpm until a homogeneous polymer/surfactants mixture (premix) was obtained (typically after an additional 2 hours of mixing).

The prepared polymer/surfactants mixture (premix) was transferred to a 10 liter Turello mixer. No heat was applied. The agitator/scraper was started at about 30 rpm and the high speed disperser was started at about 500 rpm (about 50 sec-i shear rate). An initial 50 g of de-ionized water was gradually added to the mixture while mixing. This amount of water corresponded to about 1.5 wt. % of the polymer/surfactants mixture (premix). Next, 50 g of de-ionized water was incorporated only after the previous water was fully incorporated, that is there were no visible water droplets in the mixture. The high speed disperser was adjusted between 1000 rpm (about 105 sec-1 shear rate) to near 2800 rpm (about 295 sec-1 shear rate) to ensure a effective and homogeneous dispersion. A total of 525 g water was incorporated in 50 g increments, with the last increment being 25 g, to produce a water-continuous emulsion, as evidenced by its miscibility with water.

All two runs produced water-continuous emulsions having excellent shelf and aging stability. All the emulsions exhibited no significant change after 4 months of aging, rather they remained smooth, creamy and water-dilutable. The particle size measurements for the 4 month aged samples are also summarized in the table.

To check the self-cure property, the prepared emulsion was cast on a thin aluminum container and dried in 150 C oven for 40 minutes. The dried film property was examined. The one without isostearic acid internal cure additive felt gummy, and had no characteristics of a cured elastomer; the one contained isostearic acid felt cured and elastic.

TABLE 4

| Run # | 15 | 16 |
|---|---|---|
| SiPIB polymer property | | |
| % pMS in SiPIB | 8 | 8 |
| Polymer viscosity, poise | 1,800,000 | 1,800,000 |
| Si % | 2.35 | 2.35 |
| Mn, g/mole | 30,640 | 30,640 |
| Si-grafted PIB polymer | 2500 | 2500 |
| KP-100 hydrocarbon oil | 375 | 250 |
| Emersol 873 isostearic acid | | 250 |
| Brij 30 | 80 | |
| Brij 35L (@ 72% solids) | 120 | 250 |
| Brij 97 | 120 | 125 |
| Acetic acid | 7.5 | 7.5 |
| Water, de-ionized | 515.0 | 825.0 |
| % Solids (actual) | 86.0 | 80.0 |
| Particle size, initial | | |
| D(v, 0.5), micrometers | 0.6 | 0.56 |
| D(v, 0.9), micrometers | 1.32 | 1.66 |
| Span | 1.80 | 2.64 |
| Particle size, 4-month aging | | |
| D(v, 0.5), micrometers | 0.558 | 0.515 |
| D(v, 0.9), micrometers | 1.22 | 1.5 |
| Span | 1.8 | 2.55 |
| Dried film properties | No cure, gummy | Cured, elastic feel |

Example 5

The Epion 300S used in the following examples was a dimethoxysilyl-terminated polyisobutylene with a weight-average molecular weight of 12,600 g/mole, a number-average molecular weight of 10,000 g/mole and a viscosity of about 1.6 KPa-s.

The Epion 100S was a dimethoxysilyl-terminated polyisobutylene having a weight-average molecular weight of 6500 g/mole, a number-average molecular weight of 5,000 g/mole and a viscosity of about 0.68 KPa.s. Emulsions were prepared in a Hauschild Mixer following the procedure similar to Example 1.

TABLE 5

| Run # | 13 | 14 | 15 | 16 |
|---|---|---|---|---|
| Epion 300 S Si-PIB | 40 g | 40 g | | |
| Epion 100 S Si-PIB | | | 40 g | 40 g |
| Isostearic acid | | 4 g | | 4 g |
| acetic acid | 0.08 g | 0.08 g | 0.08 g | 0.08 g |
| Brij 35L (72% solids) | 0.8 g | 0.8 g | 0.8 g | 0.8 g |
| Brij 97 | 0.8 g | 0.8 g | 0.8 g | 0.8 g |
| Dist. H2O | 10 g | 10 g | 10 g | 10 g |
| Surfactant pkg % (per solids) | 3.45 | 3.2 | 3.45 | 3.2 |
| Wt. % solids | 76.1 | 77.2 | 76.8 | 76.3 |
| Malvern, initial | | | | |
| D (v, 05) | 0.94 | 0.79 | 0.65 | 0.84 |
| D (v, 09) | 1.5 | 1.13 | 0.81 | 1.26 |
| Span | 0.9 | 0.69 | 0.41 | 0.79 |
| Malvern, 4-week aged | | | | |
| D (v, 05) | 0.505 | 0.456 | 0.372 | 0.681 |
| D (v, 09) | 1.24 | 0.92 | 0.65 | 1.22 |
| Span | 2.15 | 1.51 | 1.1 | 1.31 |
| Dried film property | no cure, gummy | cured, elastomeric | no cure, gummy | cured, elastomeric |

Example 6

The curable elastomeric polymer used in the following examples was a silane-grafted poly(isobutylene-co-paramethylstyrene) copolymer having 7.5 wt. % p-methylstyrene, a weight-average molecular weight of 66,200 g/mol; a number-average molecular weight of 28,900 g/mole, and a viscosity of 0.16 KPa-s (1.6 M poise).

As summarized in Table 6, curable emulsions of silane-grafted copolymers of isobutylene and para-methylstyrene (silane-grafted P(IB-co-pMS)) containing C54 trimer acid was prepared with the fatty acid amide salt of isosteric acid and diethanol amine (ISA-DEA surfactant salt). Empol 1043 is a commercial trimer acid of tall oil fatty acid with an average structure containing 54 carbons. The C54 trimer acid and the optional KP-100 hydrocarbon oil were incorporated into the curable silane-grafted P(IB-co-pMS) to form a homogeneous mixture. This is followed by the formation of a premix using the ISA-DEA fatty acid-amine surfactant and acetic acid. Emulsification took place by shear mixing in water at about 1.0 g aliquots in a bench-top Hauschild universal mixer till a water-continuous emulsion was formed. The emulsion had a very desirable average-particle size of 0.507 micrometers. As shown, this type of fatty acid amide surfactant is particularly effective for temperature-sensitive and high reactivity curable elastomeric polymers.

For comparison, an emulsion of similar composition was prepared using non-ionic surfactants of Brij 35L and Brij 97. As shown here, the ISA-DEA fatty acid-amine surfactant excellent curable emulsions having a trimer acid with 54 carbon atoms as the hydrocarbon carboxylic acid internal cure additive.

TABLE 6

| Run # | 17 | 18 |
|---|---|---|
| SiPIB polymer | 40.0 g | 40.0 g |
| KP-100 oil | 4.0 g | 4.0 g |
| Empol 1043 (C54 trimer acid) | 2.0 g | 4.0 g |
| Acetic acid | 0.08 g | 0.08 g |
| (ISA-DEA surfactant salt) | 6.0 g | |
| Brij 35L (72% solids) | | 3.0 g |
| Brij 97 | | 1.0 g |
| Total water addition | 21.5 g | 20.0 g |
| Finished product | smooth emulsion | smooth emulsion |
| D(v, 0.5), micrometers | 0.507 | 20.88 |
| D(v, 0.9), micrometers | 1.42 | 86.24 |
| Span | 2.45 | 4.11 |

We claim:

1. A water-continuous emulsion composition comprising;
   (A) 100 parts of curable elastomeric polymer having a viscosity of 0.5 to 1000,000 KPa-s and a glass transition temperature up to 50° C.,
   (B) 3 to 30 parts surfactant
   (C) 0.5 to 50 parts of an internal cure additive
   (D) 5 to 45 parts water
wherein the water-continuous emulsion has a solids content of greater than 75%, an average particle size less than 5 µm, having sufficient stability to produce a stable lower solids emulsion upon dilution with water.

2. The water-continuous emulsion composition of claim 1 wherein the curable elastomeric polymer is a silylated polymer derived from elastomeric polymers selected from natural rubber, styrene-butadiene, butadiene, ethylene-propylene-diene (EPDM), butyl rubber, nitrile rubber, chloroprene rubber, fluorocarbon elastomers, polysulfide rubbers, and polyurethane.

3. The water-continuous emulsion composition of claim 1 wherein the curable elastomeric polymer is a silylated polyisobutylene polymer in which at least 50 mole percent of the repeat units are isobutylene units.

4. The water-continuous emulsion composition of claim 1 wherein the curable elastomeric polymer is a silylated copolymer of an isomonoolefin and a vinyl aromatic monomer.

5. The water-continuous emulsion composition of claim 4 wherein the silylated copolymer is the reaction product of
   a) an olefin copolymer comprising at least 50 mole % of a $C_4$ to $C_7$ isomonoolefin and from 0.1 up to 50 mole % of a vinyl aromatic monomer;
   b) a silane of the general formula $RR'SiY_2$ wherein R represents a monovalent olefinically unsaturated hydrocarbon or hydrocarbonoxy radical, each Y represents a hydrolyzable organic radical and R' represents an alkyl radical, an aryl radical or a Y radical; and
   c) a free radical generating agent.

6. The water-continuous emulsion composition of claim 4 wherein the silylated copolymer comprises at least 60 mole % of at least one $C_4$ to $C_7$ isomonoolefin.

7. The water-continuous emulsion composition of claim 4 wherein said vinyl aromatic monomer is an alkylstyrene and said alkylstyrene comprises para-methylstyrene.

8. The water-continuous emulsion composition of claim 7 wherein the silylated copolymer comprises at least 80 mole % of isobutylene and from 0.1 up to 20 mole % of para-alkylstyrene.

9. The water-continuous emulsion composition of claim 1 wherein the internal cure additive is a carboxylic acid functional hydrocarbon.

10. The water-continuous emulsion composition of claim 9 wherein the carboxylic acid functional hydrocarbon is a fatty acid.

11. The water-continuous emulsion composition of claim 9 wherein the carboxylic acid functional hydrocarbon is selected from lauric acid, palmitic acid, stearic acid, isostearic acid, tall oil acid, oleic acid, linoleic acid, and linolenic acid.

12. The water-continuous emulsion composition of claim 1 further comprising;

(E) a plasticizer.

13. The water-continuous emulsion composition of claim 12 wherein (E) the plasticizer is a saturated or unsaturated hydrocarbon containing at least 8 carbon atoms.

14. The water-continuous emulsion composition of claim 12 wherein (E) the plasticizer is selected from mineral oil, carboxylic acid functional hydrocarbons containing at least 8 carbon atoms, and ester functional hydrocarbon containing at least 8 carbon atoms.

15. The water-continuous emulsion composition of claim 1 wherein the surfactant is a polyoxyalkylene alkyl ether or polyoxyalkylene alkylphenyl ether.

16. The water-continuous emulsion composition of claim 1 wherein the surfactant is a reaction product between a carboxylic acid functional hydrocarbon and an amine functional hydrocarbon.

17. The water-continuous emulsion composition of claim 16 wherein the carboxylic acid functional hydrocarbon is selected from a fatty acid and the amine functional hydrocarbon is selected from a hydrophilic amine.

18. The water-continuous emulsion composition of claim 17 wherein the fatty acid is isostearic acid and the hydrophilic amine is a secondary amine alcohol.

19. The water-continuous emulsion composition of claim 1 further comprising (F), a low molecular weight acid.

20. The water-continuous emulsion composition of claim 12 further comprising (F), a low molecular weight acid.

21. The water-continuous emulsion composition of claim 19 wherein the low molecular weight acid is acetic acid.

22. The water-continuous emulsion composition of claim 20 wherein the low molecular weight acid is acetic acid.

23. The water-continuous emulsion composition of claim 22 wherein the curable elastomeric polymer is a silylated copolymer of an isomonoolefin and a vinyl aromatic monomer, the surfactant is a polyoxyalkylene alkyl ether, the plasticizer is mineral oil, and the internal cure additive is isostearic acid.

* * * * *